(12) United States Patent
Thomas et al.

(10) Patent No.: US 6,937,761 B2
(45) Date of Patent: Aug. 30, 2005

(54) PROCESS FOR PROCESSING IMAGES TO AUTOMATICALLY EXTRACT SEMANTIC FEATURES

(75) Inventors: Corinne Thomas, Chaumont (FR); Patrick Hede, Herblay (FR); Hassane Essafi, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 622 days.

(21) Appl. No.: 10/164,285

(22) Filed: Jun. 6, 2002

(65) Prior Publication Data

US 2003/0026479 A1 Feb. 6, 2003

(30) Foreign Application Priority Data

Jun. 7, 2001 (FR) .............................. 01 07480

(51) Int. Cl.⁷ ................................. G06K 9/34
(52) U.S. Cl. ...................... 382/173; 382/164
(58) Field of Search ................. 382/162–167, 382/170–173, 190, 199, 203, 257–259, 308, 108, 205, 232, 240, 250, 128–134, 224, 176, 266, 220; 345/582, 589, 591–593, 597–599; 358/1.9, 515, 520, 462, 464–465

(56) References Cited

U.S. PATENT DOCUMENTS

| | | | |
|---|---|---|---|
| 5,181,257 A | * 1/1993 | Steiner et al. | 382/162 |
| 5,764,792 A | 6/1998 | Kennealy | 382/133 |
| 6,101,274 A | 8/2000 | Pizano et al. | 382/176 |
| 6,370,278 B1 | * 4/2002 | Waguri | 382/266 |
| 6,415,053 B1 | * 7/2002 | Norimatsu | 382/199 |
| 6,778,698 B1 | * 8/2004 | Prakash et al. | 382/164 |
| 6,803,920 B2 | * 10/2004 | Gossett et al. | 345/591 |

FOREIGN PATENT DOCUMENTS

WO    WO 00/77735    12/2000    ............. G06T/5/00

OTHER PUBLICATIONS

Gangyi et al. Robust Color Edge Detection Using Color-Scale Morphology, IEEE 0-7803-3679, 227-232.*

* cited by examiner

Primary Examiner—Amelia M. Au
Assistant Examiner—Ishrat Sherali
(74) Attorney, Agent, or Firm—Weingarten, Schurgin, Gagnebin & Lebovici LLP

(57) ABSTRACT

In the method, correlated achromatic single-plane images are subjected to a plurality of operations for segmenting them into uniform components on the basis of different criteria. The results of the various segmentation operations for each of the processed correlated images are analyzed in order to generate cores constituted by zones presenting high certainty as to the existence of objects. The resulting cores are compared and those zones which correspond to more than some determined threshold of the various cores are conserved as indicating the presence of an object. The previously processed images are subjected to a weighted summing operation in order to obtain a first result image containing the uniform component cores. The first result image is then subjected to coloring followed by binarization in order to obtain a second result image containing the uniform components, and the individualized objects are extracted from the image.

14 Claims, 8 Drawing Sheets

PROCESS FOR PROCESSING IMAGES TO AUTOMATICALLY EXTRACT SEMANTIC FEATURES

The present invention relates to a method of processing images to extract semantic elements automatically.

The invention also provides a method of processing images to partition an image or a plurality of elements or objects of meaningful shape automatically on the basis solely of the data constituting the image to be analyzed.

At present, the increase in the quantity of image type data that is in use in applications or on computer networks is leading to very serious problems of organization. It is desirable to be able to find a particular image amongst thousands, and where possible to do so quickly. For this purpose, it is necessary to describe the content of such images. In the best of cases, the images are indexed manually. That procedure shows its limits very quickly concerning both the quality of images processed and indeed the quantity of the indexing achieved. The manual procedure is lengthy and tedious given such a large number of images. Furthermore, that type of indexing is effective only for bases where both the indexers and the users have the same level of expertise. In addition, given the time needed to constitute such catalogs, it is illusory to hope that the images can be described with sufficient precision or objectivity. The objective of a future search is not always known during the indexing process: under such circumstances, there are always important elements in an image that are ignored.

Since long before the exponential growth in the quantity of images conveyed by computer means gave rise to problems of storage, the image processing community has been attempting, with little success, to extract components from an image in order to attempt to associate semantic content therewith.

In order to attempt to solve the problem which consists in distinguishing the essential from the inessential in an image, the community of image processing experts has developed several approaches. Nevertheless, earlier work shows that over the last thirty years, in spite of numerous international efforts, no method of segmenting an image has been able to achieve satisfactory success rates on large numbers of images, as required in industrial image databases, for example. The limits of the methods normally used quickly become apparent. Most image segmenting techniques are effective only on a restricted number of images in which it is often possible to reveal characteristics in common. They often share similar themes or they share picture-taking or acquisition conditions that are practically identical or ideal.

Known methods do not enable subdivisions to be performed that lead to an object being located in automatic manner.

Amongst known segmentation methods that do not require a priori knowledge, there are two main classes.

The first class comprises methods adapted to uniform images. Those methods are certainly the oldest and the best known. The idea is to locate outlines that define a significant change in gray level.

Segmenting uniform images consists either in detecting a change between two regions of an image, or in grouping together pixels that have characteristics that are similar. Information concerning the gray level of a pixel is sufficient information for performing this task. The first approach concerns detecting outlines and the second relies on causing regions to grow.

Known methods of detecting outlines are nevertheless generally highly sensitive to noise or else they require large amounts of computation time, and often they also require an outline to be initialized, i.e. a priori knowledge about the position of the object. Such methods are therefore insufficient for achieving the necessary reliability.

Methods based on making regions grow consist in fusing together a set of pixels having characteristics that are similar. These methods can be carried out from various levels, the most elementary level being pixel level. The first of the methods is an up method in which pixels are clumped together when they are both similar and close together. The second method is a technique that enables a partitioning of the image into regions to be changed on the basis of only two types of information: an attribute of the pixel being processed and the class of its neighbors. The process is iterative and converges on an image being partitioned starting from pre-segmentation thereof or from a random draw. This approach can produce a phenomenon of over-segmentation when the regions are large in size.

Color segmentation methods are also known that rely on the use of a color model. Nevertheless, these methods perform very local analysis of an image, at pixel level, and they do not take account of the effects of background contrast difference.

The second class of known segmentation methods comprises methods adapted to images that have texture.

The methods adapted to textured images comprise two separate classes. The first relates to Bayesian methods, i.e. methods using a random model of texture which normally requires knowledge about the type of texture being looked for in order to achieve satisfactory results, and that constitutes a limitation. The second type consists in extracting statistical attributes of first, second, or third order, and then in using a classification method (data analysis method, neural method), and it presents effectiveness that is very limited.

The result of an example of the conventional segmentation method is shown in FIG. 18. Such methods do not enable acceptable results to be obtained on images that are varied in kind.

Thus, known methods are not capable of locating known shapes in satisfactory manner.

Either they rely on special knowledge in addition to the images, or else, if they manage to operate without a priori knowledge, they cannot give a shape close to that of an object and they make do with producing regions that are independent of any notion of an object.

In particular, known methods do not enable pertinent objects to be extracted in acceptable manner for the purpose of indexing images, and they do not enable operation to be performed entirely automatically, without any recourse to a human operator during the processing.

The present invention seeks to remedy the drawbacks of the prior art and makes it possible in entirely automatic manner to process images of different kinds without a priori knowledge of the nature of the images in order to identify the components of said images that constitute objects of shapes that are semantically meaningful and comprising regions of pixels that are not necessarily uniform.

The invention seeks to provide a method of processing images that makes it possible subsequently either to index processed images automatically in order to obtain results that are pertinent for searching through images by interrogation concerning their content, or else to recognize the shapes of objects, or indeed to track targets in sequences of images or in video editing.

According to the invention, these objectives are achieved by a method of processing images automatically to partition an image or a plurality of elements or objects of shape that is meaningful, and to do so solely on the basis of the data constituting the image to be analyzed, the method being characterized in that it comprises the following steps:

a) producing, from the image to be analyzed, first, second, and third correlated achromatic single-plane images containing all of the information in the image to be analyzed but presenting different color characteristics;

b) subjecting the first, second, and third images to a plurality of segmentation operations to find uniform components based on differing criteria;

c) for each of the first to third processed images, analyzing the results of the various segmentation operations in order to generate "cores" that are constituted by zones presenting high certainty of the existence of objects in association with each of the first to third processed images;

d) for each of the first to third processed images, comparing the cores that result from the various segmentation operations and conserving as indicative of the presence of an object those zones which correspond to more than a determined threshold of different cores;

e) performing weighted summing of the first to third images as processed in order to obtain a first result image containing the cores of the uniform components;

f) coloring and then binarizing the first result image in order to obtain a second result image containing the uniform components; and g) extracting the individualized objects from the image.

Advantageously, the method has an additional step h) of producing a de-correlated fourth image using the hue-saturation-value (HSV) model starting from the image to be analyzed; also applying steps b), c), and d) to the fourth image; and after step f), performing a step i) of reconstructing an image identifying individualized objects by combining the second result image with the previously-processed fourth image so as to obtain a third result image, and in proceeding again with coloring the third result image, prior to extracting the individualized objects of the reconstructed image.

Preferably, the correlated achromatic single-plane first, second, and third images are produced by splitting the image to be analyzed into three frequency bands in the red, green, blue (RGB) color space.

In a particular embodiment, during step b) of segmenting into uniform components by using a plurality of different criteria, the following steps are performed:

i) detecting outlines; and ii) detecting texture characteristics via filtering that is equivalent to a bank of highpass and lowpass filters.

Advantageously, during step b) of segmenting into uniform components using a plurality of different criteria, the following step is also performed:

iii) chromatic and achromatic detection.

Coloring step f) consists in starting from an initial pixel and in coloring each of its nearest neighbors with a similar color value if the value of a nearest neighbor is distant by less than a given metric from the initial pixel, and in reiterating the process recursively, each of the nearest neighbor pixels becoming in turn an initial pixel.

In a particular implementation, steps b) and c) are performed at least twice, on each occasion performing the segmentation operations by using sets of input control parameters that are nominally defined with different values.

According to another particular characteristic, within each segmentation operation, the input control parameters are modified automatically at the end of a segmentation process if the results obtained are not meaningful, in which case the segmentation process is reiterated automatically by looping back through the process using modified new values for the input control parameters.

In a particular implementation, an operation of segmenting into uniform components by detecting outlines with an optimum filter comprises the following steps:

converting the initial RGB space to be processed into a single luminance plane;

averaging in order to eliminate noise associated with acquisition;

calculating horizontal and vertical gradients;

summing the two gradient images in order to obtain a single image;

seeking the minimum and the maximum in the resulting image in order to determine high and low thresholding values;

thresholding by hysteresis relative to the previously-determined high and low thresholding values;

eliminating edges;

binarizing;

morphological opening followed by multiple morphological closing in turn followed by multiple morphological opening; and filling in the holes in order to convert the resulting outlines into a result that is available in the form of regions.

In another particular implementation, an operation of segmenting into uniform components by detecting texture characteristics using filtering equivalent to a bank of highpass and lowpass filters comprises a wavelet transformation process which is performed firstly on the rows and secondly on the columns of the image, each time using a lowpass filter, characterized by the formula:

$$y(i)=0.5*x(i)+0.5y(i-1)$$

and a highpass filter, characterized by the formula:

$$y(i)=0.5*x(i)-0.5y(i-1)$$

each element (i,j) of the 3D attribute matrix that results from the splitting being a vector characterizing the distribution of pixel values in the vicinity of the point (i,j).

After each operation of filtering by a highpass filter and a lowpass filter, the number of images obtained is divided by $2^n$ so as to reduce the number of images to be processed, the integer number n being greater for higher resolution and larger size of the image to be processed.

The wavelet transformation process is reiterated a plurality of times over n stages, and after a smoothing stage, the size of the resulting 3D attribute matrix is reduced in depth by retaining only the [2n+(n-1)] images that contain the most detail.

Preferably, a process is performed of seeking the partitioning of the attribute matrix that is best in terms of maximizing energy.

In yet another particular implementation, an operation of segmenting into uniform components by performing chromatic and achromatic detection comprises a step of converting the image into the HSV model, a step of achromatic propagation in order to eliminate the background, an opening step performed during a first iteration to eliminate noise and in order to reconnect regions, and in the event of non-convergence at the end of this first iteration, a closing step performed during a second iteration.

Other characteristics and advantages of the invention appear from the following description of particular implementations, given with reference to the accompanying drawings, in which:

FIG. 1 shows an input image 10 to be processed, which image may be a color image but could equally well be a black and white image, and the subject of the image is not known a priori.

The method of the invention makes it possible to show up clearly and in a manner that is entirely automatic, the locations of elements that are of meaningful shape, i.e. of detected zones, the elements having semantic meaning that is not formulated and not named, but that corresponds to an object of identifiable shape which may be real or symbolic.

In the invention, image processing consisting in cutting out an object of meaningful shape from an image takes place essentially in three steps.

Initially, the image is processed simultaneously by a plurality of subdivision processes, and then the results obtained are analyzed in order to generate zones referred to as "cores" where it is highly certain that objects exist, and finally these cores are used during the third step to outline the objects that are present in the image.

Figure 1:
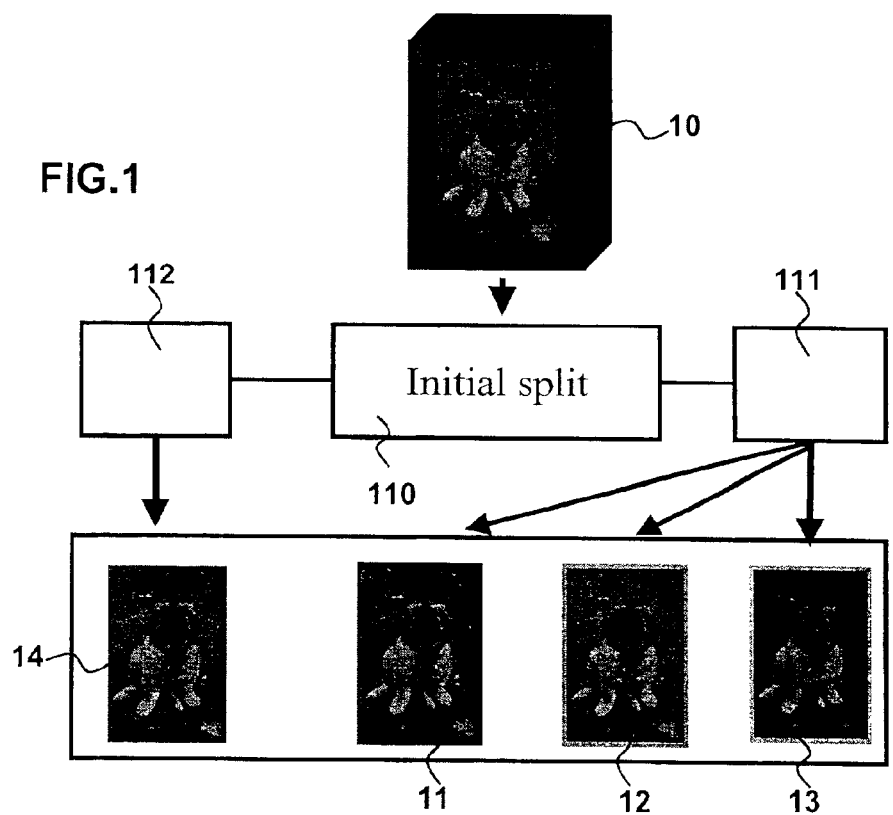
FIG. 1 is a diagrammatic view showing a first step in the method of the invention consisting in performing preliminary subdivision on an initial image in order to obtain a plurality of intermediate images.

The image 10 for processing is initially subjected to prior processing or prior subdivision (110) (FIG. 1).

In order to be able to locate zones worthy of interest on a reliable basis, the information in the initial image 10 is used several times over so as to reinforce the certainty concerning regions in which an object is present.

In a preferred example, and using the red, green, blue (RGB) color model, prior subdivision step 110 produces in module 111 correlated first, second, and third achromatic single-plane images 11, 12, 13 that are obtained by splitting the image to be analyzed into three frequency bands in the RGB color space.

In FIG. 1, it can be seen that all of the various bands in the image are very similar. The purpose of using the redundancy in these correlated images 11 to 13 is indeed to obtain a final result that is very similar. Thus, at the end of the process of subdividing the image into these various bands, information about the location of an object will tend to reinforce certainty concerning the presence of the object in the initial image. This triple view, combined with very different kinds of analysis being performed on the contents of the images, provides an almost-exhaustive palette of characteristics concerning the presence of objects contained in images.

In parallel with separating the initial image 10 into three bands, it is also possible during the prior subdivision step 110 to use a de-correlated color module 112 which serves to show up better the hue characteristics of the image in an additional intermediate image 14.

Uniformity in terms of hue, contrast, or brightness is a pertinent element in the process of subdividing an object. Unfortunately, such information concerning hue, contrast, or brightness does not exist in the RGB model. Of the various existing color models that might be used, the chromatic model turns out to be preferable to a calorimetric model which is expensive in terms of computation time and requires a priori knowledge of the image which is not available. It is thus advantageous to use the hue saturation value (HSV) model.

At the output from the modules 111 and 112 in the prior subdivision step 110, first through fourth intermediate images 11 to 14 are obtained, namely three single-plane images 11 to 13, and a color image 14 made up of three planes on which subsequent processing is performed.

Figure 2:
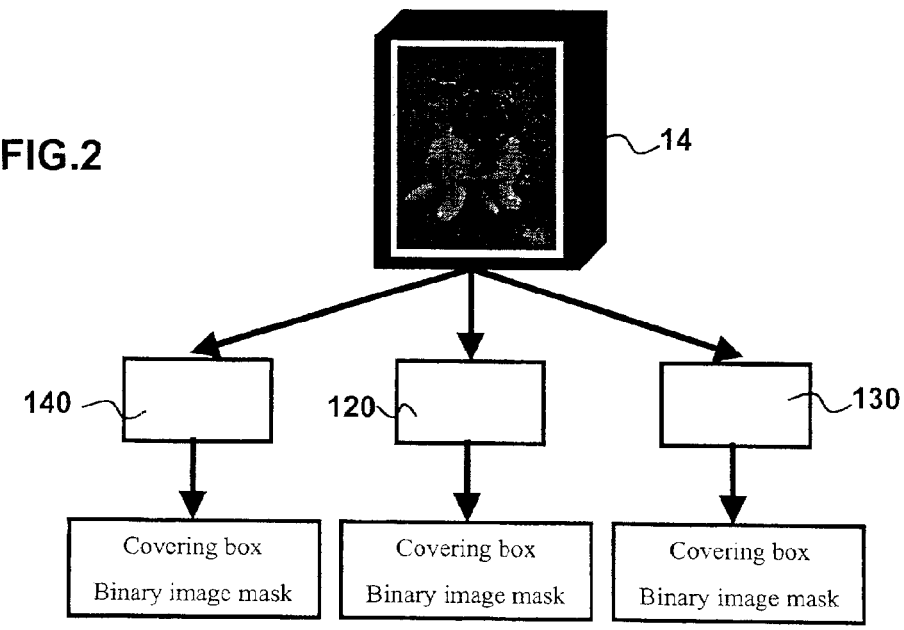
FIG. 2 is a diagrammatic view showing a second step of the method of the invention in which one of the intermediate images is subdivided using three different segmentation methods.

As can be seen in FIG. 2, methods 120, 130, and 140 for subdividing or segmenting images into uniform components are applied to each of the intermediate images such as 14. Each of these methods is based on a different criterion and delivers an output file giving the Cartesian coordinates of covering boxes together with the image of the binary mask that defines the segmentation.

Figure 6:
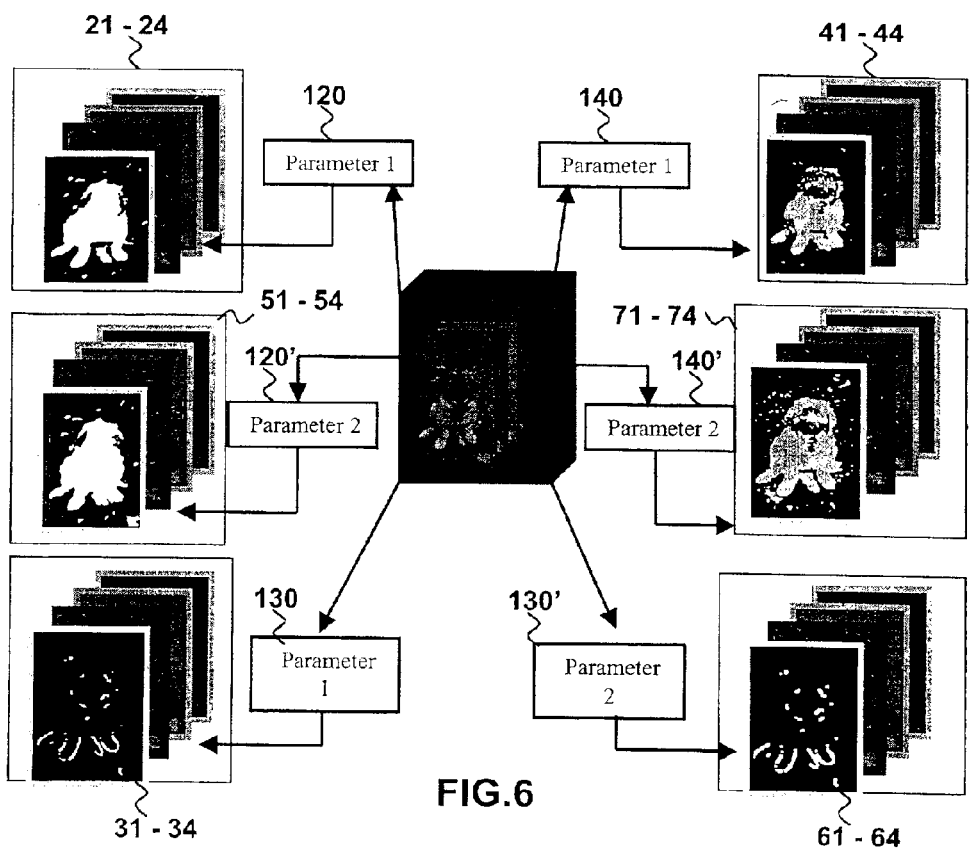
FIG. 6 is a diagrammatic view showing the second step of the method of invention being applied to subdivide a set of intermediate images using three different segmentation methods and two successive passes implementing different predefined parameters for the segmentation operations.

In order to cover a broad range of images, it is possible to use each of these subdivision processes 120, 130, 140 with two sets of input control parameters defined nominally, such that six processes 120, 120', 130, 130', 140, 140' are applied to the images 11 to 14, which processes in the present example are based on three different criteria (FIG. 6).

At the end of subdivision processes using two sets of parameters, six images 24, 34, 44, 54, 64, and 74 are obtained from the image 14 together with eighteen other images coming from the three-band separations 11, 12, 13 of the initial image 10 passing through the subdivision processes, likewise with two sets of parameters. These parameters can be completely different as a function of algorithm convergence. In all, in the example described, there are twenty-four images containing potential candidate regions for the presence of an object. These images are referenced 21 to 24, 31 to 34, 41 to 44, 51 to 54, 61 to 64, and 71 to 74 in FIG. 6.

Three particular examples of complementary methods for subdividing the intermediate images 11 to 14 are described below with reference to FIGS. 3 to 5, these methods together making it possible to obtain a complete charting that is representative of the initial image 10.

The subdivision processes are designed so as to subdivide excessively in the worst of cases, with a subsequent arbitration step serving to eliminate zones that are erroneous.

The three subdivision methods presented above respond respectively to texture, outlines, and color.

The purpose of the subdivision method 120 based on texture is to subdivide the image into a plurality of regions in which each region possesses a uniform appearance having statistical and visual properties that are different from the others.

Figure 3:
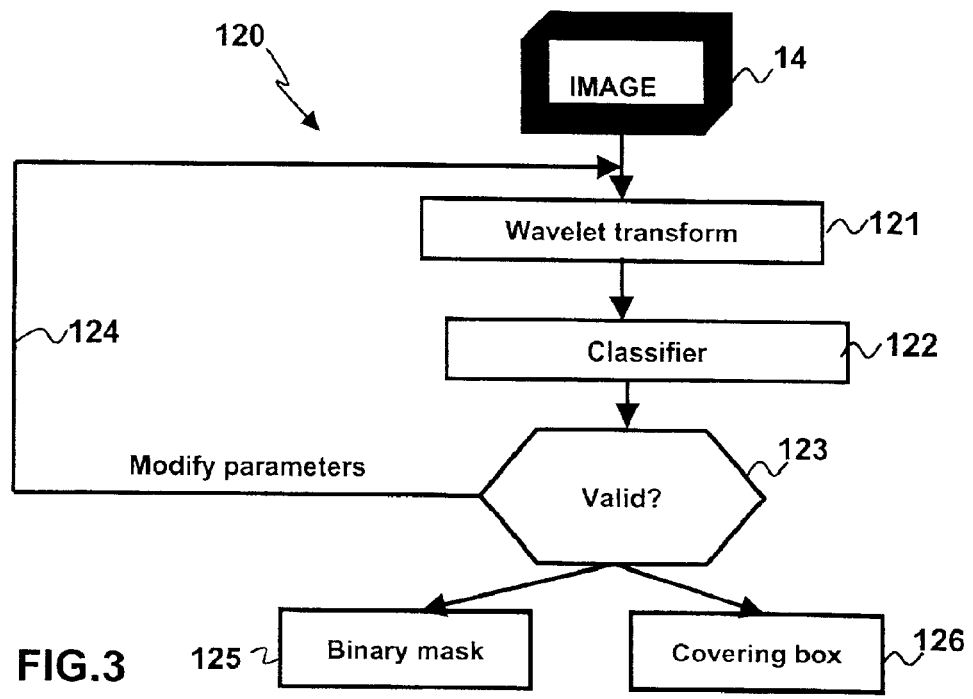
FIG. 3 is a flow chart showing a first example of a segmentation method applied to the intermediate images of FIG. 1.

An example of a subdivision method 120 of this type based on space and time filtering is shown in FIG. 3.

The segmentation module 120 detects texture characteristics via filtering that is equivalent to a bank of highpass and lowpass filters applied to the intermediate image 11, 12, 13, or 14 that is to be segmented. The module 120 outputs a binary mask together with a text file continuing the Cartesian coordinates of the boxes that cover the objects that have been located in the image.

The wavelet transform 121 serves to obtain unique information relating to the frequency domain of the image. The wavelet transformation provides good localization in the space and frequency domain, in particular in the domain of textures, and it turns out to have higher performance than methods using co-occurrence matrices or the Fourier transform.

An optimized method serving to extract and characterize image components presents the following characteristics:

A wavelet transform is preferably of the recursive type and presents lowpass and highpass filters that are preferably of size 5, although adjacent sizes, e.g. 4 or 6, could also be envisaged.

A lowpass linear filter of size 5 is characterized by indices $a_0$ to $a_5$ and $b_1$ to $b_4$ as follows:

$$y(i)=a_5*x(i-5)+a_4*x(i-4)+a_3*x(i-3)+a_2*x(i-2)+a_1*(i-1)+a_0*x(i)+b_4*y(i-4)+b_3*y(i-3)+b_2*y(i-2)+b_1*y(i-1)$$

A highpass linear filter of size 5 is characterized by the indices $c_0$ to $c_5$ and $d_1$ to $d_4$ as follows:

$$y(i)=c_5*x(i-5)+c_4*x(i-4)+c_3*x(i-3)+c_2*x(i-2)+c_1*(i-1)+c_0*x(i)+d_4*y(i-4)+d_3*y(i-3)+d_2*y(i-2)+d_1*y(i-1)$$

Good results have been obtained selecting, for example, $a_0=0.5$, $b_1=0.5$, $c_0=0.5$, $d_1=-0.5$, and all the coefficients are zero.

The result of this subdivision using lowpass and highpass filters is a three-dimensional (3D) attribute matrix, each element (i,j) of the matrix being a vector characterizing the distribution of pixel values in the vicinity of the point (i,j).

The wavelet transformation process with lowpass and highpass filters is implemented firstly on the rows and subsequently on the columns of the image.

The transformation process can be reiterated a plurality of times over n stages, e.g. two or three stages.

After a smoothing stage, it is possible to reduce the size of the attribute matrix in depth by retaining only the [2n+(n−1)] images that contain the greatest amount of detail, where n is the number of stages.

While reducing the number of images (e.g. in order to retain only eight out of sixty-four images when n=3), it is possible to conserve a first image that results from applying the lowpass filter in each of two directions, to eliminate an image resulting from applying the highpass filter in both directions, and to proceed with successive comparisons on the remaining images, where appropriate implementing fusions in order to obtain the other (2n+n−2) images to be retained.

It is also possible to use a method based on analyzing the principal components of the attribute matrix.

In order to reduce fluctuation between attribute vectors of pixels having the same texture, a search is made to find the partition of the attribute matrix that is best in terms of some given criterion, e.g. maximizing energy, giving rise to a region image in which the pixels within any one region having similar attributes share a common label. To do this, it is possible to use an algorithm of the c-means type. This technique is also known as "clustering" and consists in grouping together in identical classes those pixels or groups of pixels whose characteristics tend to form clusters in parameter space.

The result of this distribution using a classifier 122 is a labeled image in which the pixels in any given uniform zone have the same label.

This image is processed to identify objects and the corresponding covering boxes.

Thus, different regions are labeled by locating the possible positions of various objects that are represented by their respective shapes. Shape can be represented by a covering box defining the extent of the object in two dimensions and a binary mask image is also conserved since it is only the mask that provides sufficiently great accuracy for locating the object while minimizing outline ambiguity. The binary mask is used subsequently in another module. Finally, it should be observed that the various portions of the algorithm are optimized for operating on parallel machines.

The results of the subdivision processing within the modules 121 and 122 including the steps of splitting the image into four different frequency band images, of normalization, of fusion, of classification, and of labeling are evaluated in a validation step 123. If the results do not appear to be satisfactory, the parameters of the module 121 are modified (line 124) and the intermediate image such as the image 14 is segmented again using the same process, but with modified parameters. Parameter modification can be performed several times until the subdivision process converges on a plausible solution.

The output from the module 120 comprises a binary mask 125 and a covering box 126.

Figure 4:
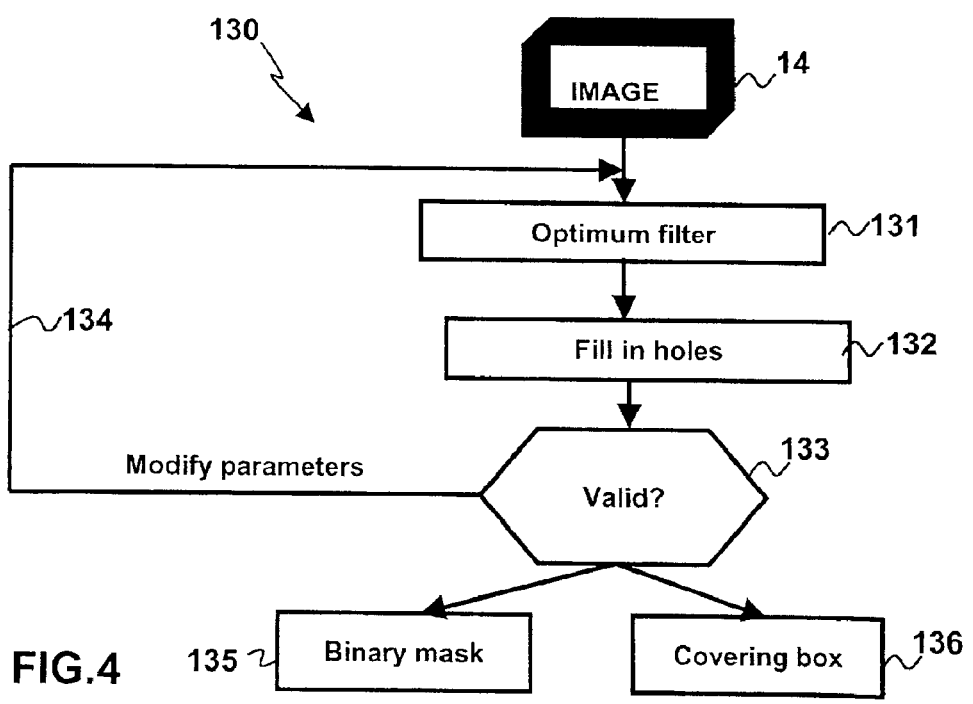
FIG. 4 is a flow chart showing a second example of a segmentation method applied to the intermediate images of FIG. 1.

FIG. 4 shows the implementation of a representation module 130 for detecting the outlines of an intermediate image such as the image 14 using an optimal filter 131.

The module 130 serves to provide information relating to sudden transitions in pixel values that mark the presence of a boundary of an object. It should be observed that the method of segmentation by detecting outlines using an optimum filter 131 is implemented in a particular manner, without closing the outlines in the final portion of the process. In order to avoid leaving open outlines that would prevent it being possible to decide on the shape of an object, the result obtained from the outlines is transformed into an available result in the form of regions using a step 132, e.g. based on filling in holes.

Step 132 is followed by a step of locating the positions of various candidate objects, i.e. identifying objects. This locating step can be based on a labeling algorithm. A validation step 133 may include a final validation condition which leads to the processing terminating, for example, if the number of objects that have been identified is greater than or equal to 1. The output is then in the form of a binary mask 135 and a covering box 136. In contrast, if the stop criterion is not reached in the validation step 133, i.e. if no object has been identified, then the input control parameters are modified in line 134 and the process of segmentation by detecting outlines in the image is reiterated with modified parameters. As an example of parameter modification, it is possible to reduce the value of the minimum Euclidean distance for grouping zones together.

More particularly, the optimum filter 131 plus the step 132 of filling in holes can comprise the following steps:

converting the luminance of the initial RGB space in the image to be processed into a single plane;

applying convolution using a noise-removing averaging filter;

applying Prewitt convolution to detect horizontal and vertical outlines (computing horizontal and vertical gradients);

summing the two gradient images in order to obtain a single image;

seeking the maximum and the minimum in the gradient image in order to determine high and low thresholding values;

thresholding by hysteresis (e.g. minimum=3 times average and maximum=4 times average);

eliminating edges;

binarizing;

morphological opening followed by multiple morphological closing, again followed by morphological opening;

filling in holes to transform the result obtained from the outlines into a result that is available in the form of regions; and labeling.

Figure 5:
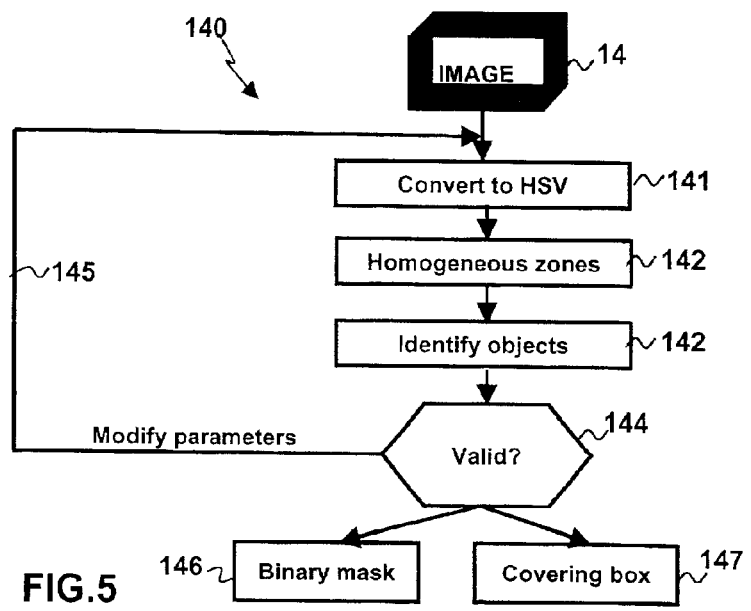
FIG. 5 is a flow chart showing a third example of a segmentation method applied to the intermediate images of FIG. 1.

FIG. 5 shows a module 140 for segmentation into uniform components, based on detection that is chromatic and automatic, which technique is useful when the initial images 10 are in color, and serves to define regions of uniform color.

The intermediate image for segmenting, such as the image 14, is converted in a step 141 into a pertinent color space, for reactors using the hue saturation value (HSV) model.

In a step 142, adjacent zones and/or pixels that are similar chromatically and achromatically, where similarity is based on a criterion of a Euclidean metric, are grouped together within a common region and/or zone. By means of this mechanism of grouping together in uniform zones, small variations in hue do not affect the process of numbering a region.

In contrast, any significant change in hue or in saturation as a function of a certain degree of luminance reflects a change to some other type of region.

Thereafter the method comprises a step 143 of locating the positions of various candidate objects (object identification step). This step of locating objects can be based on a labeling algorithm.

The processing is halted by a validation step 144. If the final condition for validation is satisfied, for example if the number of identified objects is greater than or equal to 1, then in step 146 the binary mask image is saved and in step 147 a file is written defining covering boxes.

If the final validation condition is not satisfied, then the input control parameters for the segmentation method are modified (line 145). For example, the value of the minimum Euclidean distance for grouping zones together is reduced and the algorithm is relaunched using this new value.

In a particular implementation of the segmentation module 140 of FIG. 5, it is thus possible to have the following steps:

loading an intermediate image such as the image 14;

coloring to eliminate background;

deleting non-zero zones adjacent to the edges;

performing morphological operations: opening or closing depending on the number of iterations, for example in the first iteration, opening is performed in order to eliminate noise and to reconnect regions, and in the event of non-convergence at the end of said first iteration, then closing is used in the second iteration;

labeling; and creating a covering box for each object that is found.

The subdivision operations performed during segmentation steps 120, 130, and 140, and possibly reiterated with different input control parameters during steps 120', 130', and 140' are operations that consist in finding zones of an image that are uniform (in the meaning of each given subdivision process). This is of use for differentiation or recognition purposes. For example, it can be desired to separate the sky from trees in a landscape photograph.

In a given image, the various techniques used do not necessarily give the same subdivisions, and in addition, some of the techniques have behaviors that differ as a function of their parameters so that a single technique can give final subdivisions that are very diverse, merely by using parameters that are slightly different.

In the method of the invention, the results of a plurality of subdivision processes are compared in order to achieve a new subdivision that makes use of the information in all of the others. This additional step derives a consensus from the various subdivisions and emphasizes information where all (or nearly all) of the processes agree while eliminating contradictory information.

This process of achieving co-operation between the results is performed in two steps. A results arbitration step (FIGS. 7 to 9) and a reconstruction step (FIGS. 10 to 13).

After the step of FIG. 6, for any one image, there are a plurality of subdivisions. If all possibilities are taken into account, it is possible to have subdivisions into two zones (an object and a background), into three zones (two objects and the background), etc. It is therefore necessary to provide processing that is valid regardless of the number of regions. In addition, the number of zones is a parameter that can vary from one subdivision to another: one subdivision process might have found three elements while another might have found seven, for example.

It is of interest to observe at this stage that the processing no longer depends on the starting image 10, and that work is done only on the subdivisions (images 21 to 24, 31 to 34, 41 to 44, 51 to 54, 61 to 64, and 71 to 74). The subdivision is by zones of the kind that can be had for "painting by numbers" in which a different color is to be put into each zone, depending on the number in the region that is going to be painted.

The principle of integration is to associate regions between the various subdivisions (between subdivisions and not within the same subdivision). This serves to construct a new subdivision containing information from all of the initial subdivisions.

The idea is to find consensus between the various subdivisions and under no circumstances to weed out bad subdivisions so as to retain only a single good subdivision.

Taking by way of example an image comprising two types of zone, a background and an object, this image will give rise to one region per subdivision process, with each of these regions having a different area. All of these regions share approximately the same center of gravity corresponding more or less to the center of the object. The subdivisions are binary (background or object). Putting the results of such subdivision into correspondence is simple since there is only one option. The zone representing the object is superposed between the various subdivisions. This makes it possible to define a core (zone which is common to all of the various subdivisions) after which all that needs to be decided is how many subdivisions need to agree for the core to be retained. This quantity may be set at 80% for example. This means that for ten subdivision processes, eight of them must be superposable for the core to be retained. For example, it can be considered that all of the subdivision processes present an identical success rate (a probability in the range 0 to 1). However it is also possible to use a success rate that is associated with the quality of the particular subdivision process used (weighted summing). The above principle is generalized to some number N of zones, by summing all of the success ratios of the various subdivision processes.

The locations and the sizes of the regions naturally vary as a function of the subdivision method used, however the number of regions may also vary from one subdivision to another.

Once matching has been performed, there will be a set of N regions that are referred to as "cores". The zone where all of the (non-empty) regions overlap is a set of pixels which is very likely to belong to the object (theorem of independent probabilities).

The situation in which no core is found of size that is sufficiently large relative to the size of the image, i.e. when there are no points in common between all of the subdivisions, ought not to arise in practice because the principle of convergence of the subdivision processes (loops 124, 134, 145 in FIGS. 3 to 5) leads to at least one object existing.

Figure 7:
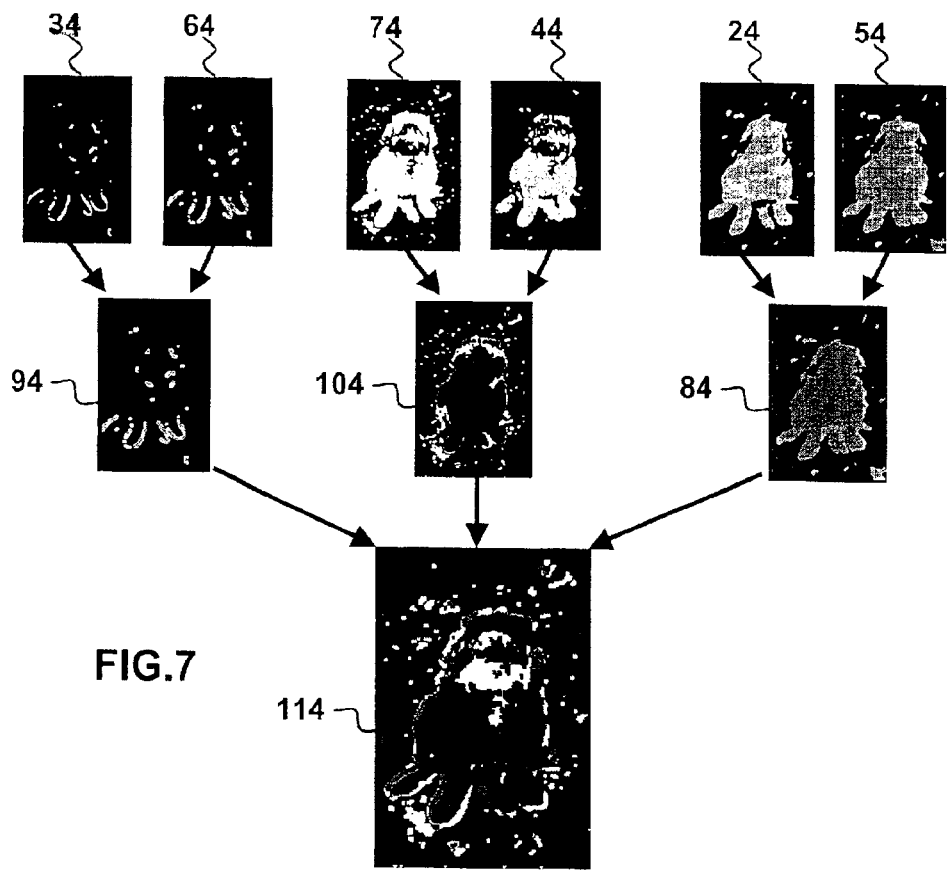
FIG. 7 is a diagrammatic view showing a third step of the method of the invention being implemented with the formation of cores.

By way of example, FIG. 7 shows the binary masks of the images 34, 64; 44, 74; 24, 54 obtained using an intermediate image 14 after performing the segmentation processing of steps 130, 130', 140, 140', 120, 120' respectively in FIG. 6.

The images 34 and 64 coming from the same subdivision process 130 but using different input control parameters are combined in order to obtain an image 94.

Similarly, the images 44, 74 from the single subdivision process 140 using different input control parameters are combined to give an image 104.

The images 24 and 54 from the single subdivision process 120 but using different input control parameters are combined to give an image 84.

The images 94, 104, and 84 are themselves combined to form an image 114 in which the shaded zones identify the main cores.

Figure 8:
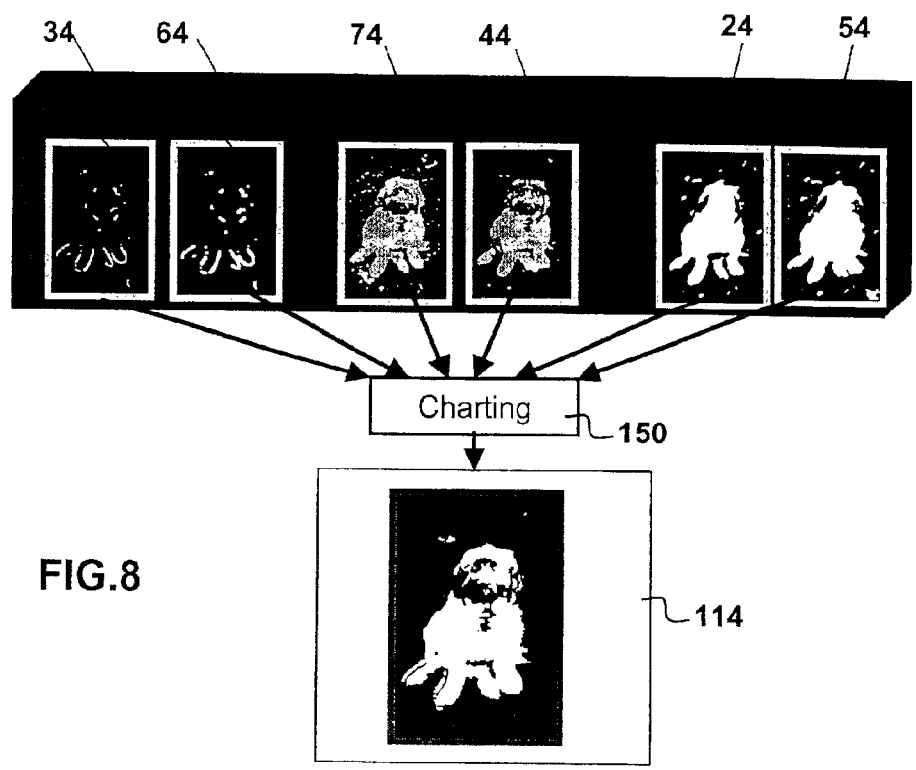
FIG. 8 is a diagrammatic view of a charting process performed on a de-correlated intermediate image.

FIG. 8 summarizes the above-described process and shows the image 114 obtained by performing the charting operation 150 involving steps of analyzing the binary mask images 34, 64, 44, 74, 24, and 54 that result from the various segmentation operations performed on the de-correlated intermediate image 14 that comprises three planes.

Figure 9:
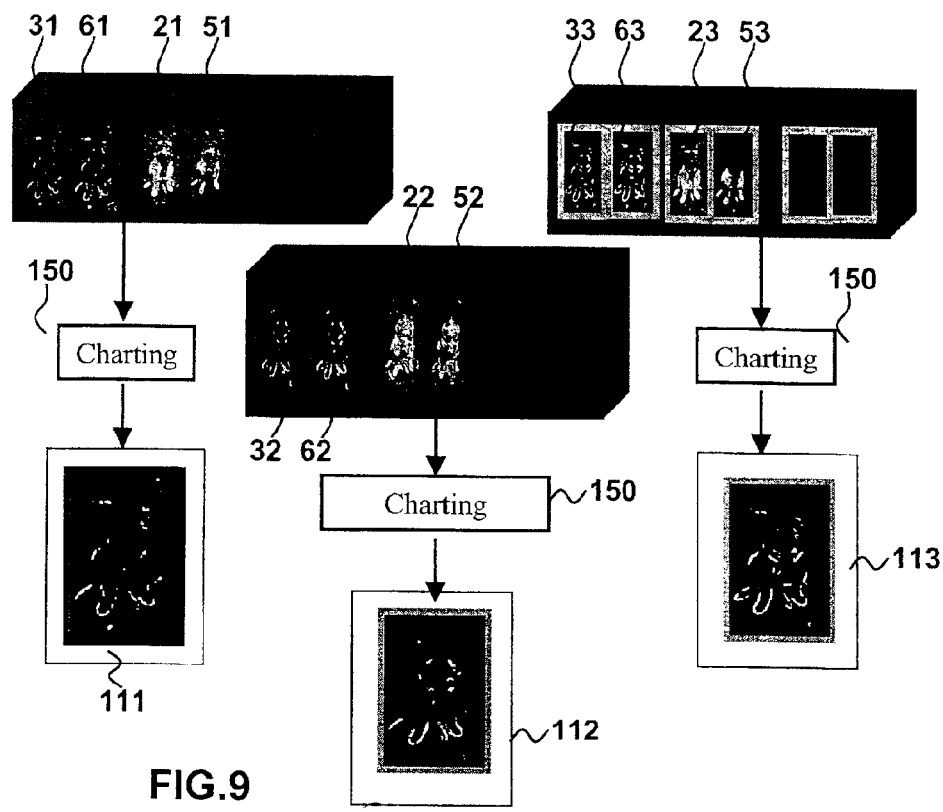
FIG. 9 is a diagrammatic view of a charting process performed on de-correlated intermediate images.
Figure 10:
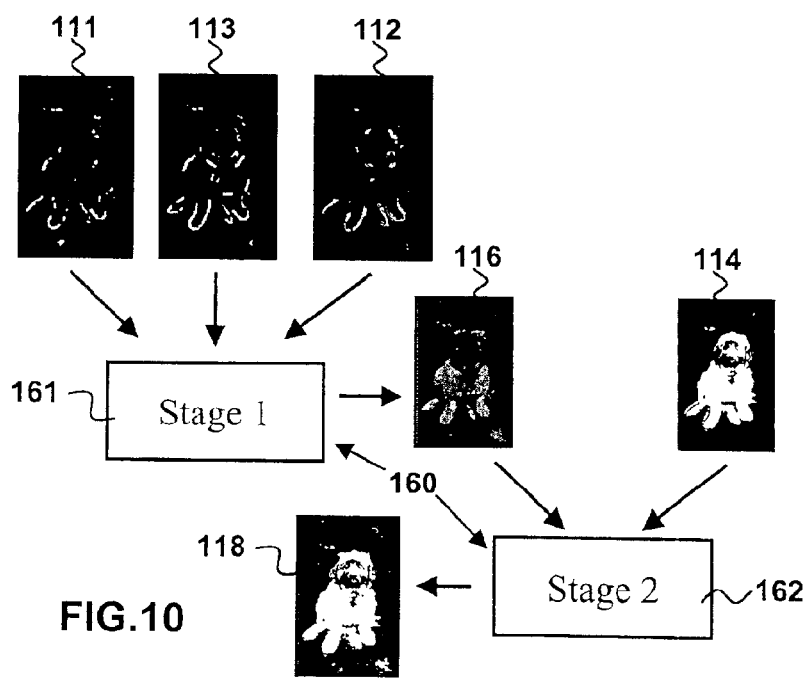
FIG. 10 is a diagrammatic overall view of a step of reconstructing an image from an initial image and correlated images and the de-correlated image obtained at the end of the charting process.
Figure 11:
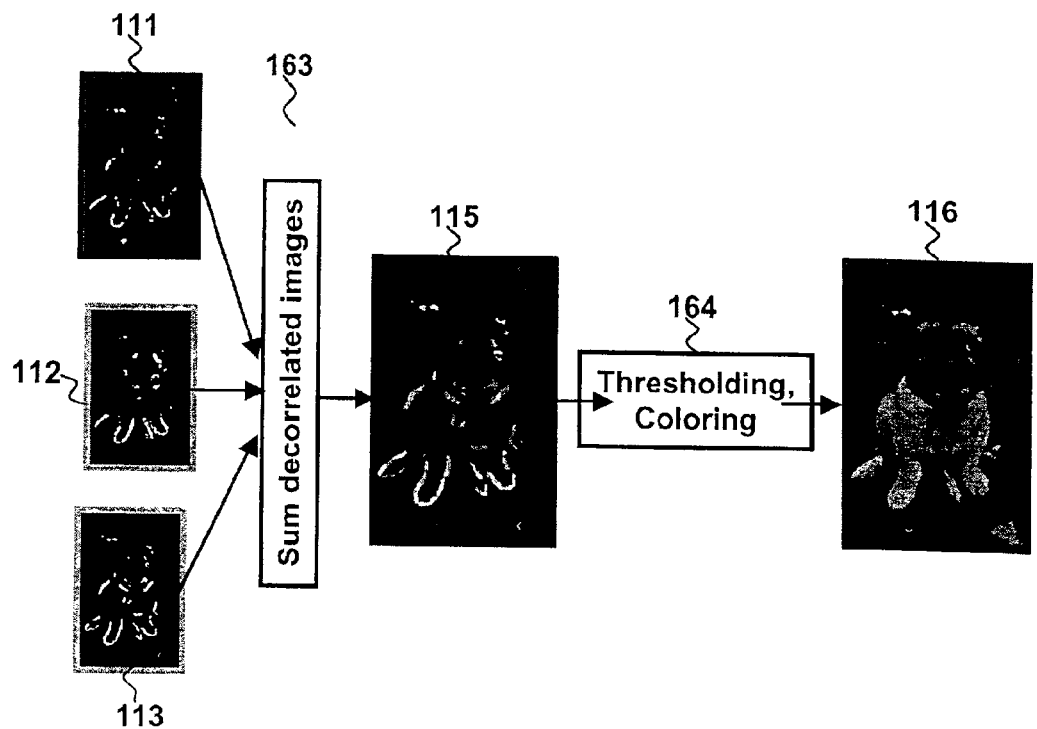
FIG. 11 is a diagrammatic view showing a step of weighted summing of correlated images, of thresholding, and of coloring.
Figure 12:
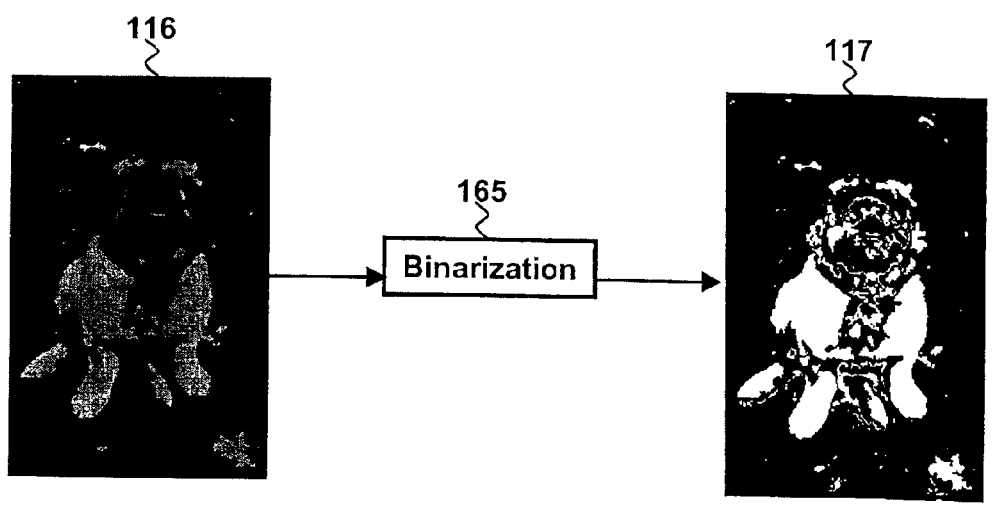
FIG. 12 is a diagrammatic view showing a binarization step based on an image obtained from the step of FIG. 11.
Figure 13:
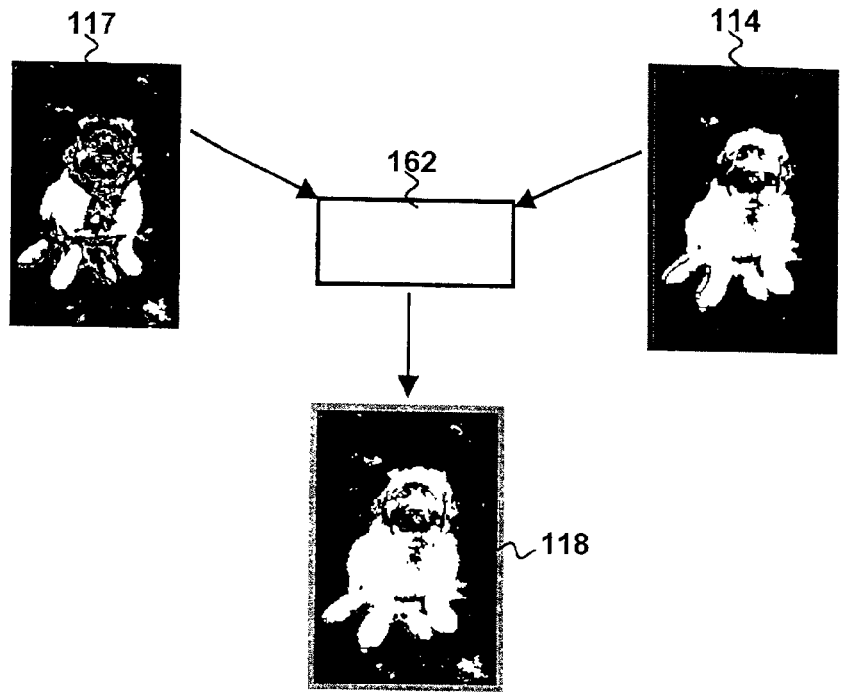
FIG. 13 is a diagrammatic view showing a step of reconstructing an image from a de-correlated image obtained at the end of the charting process.
Figure 14:
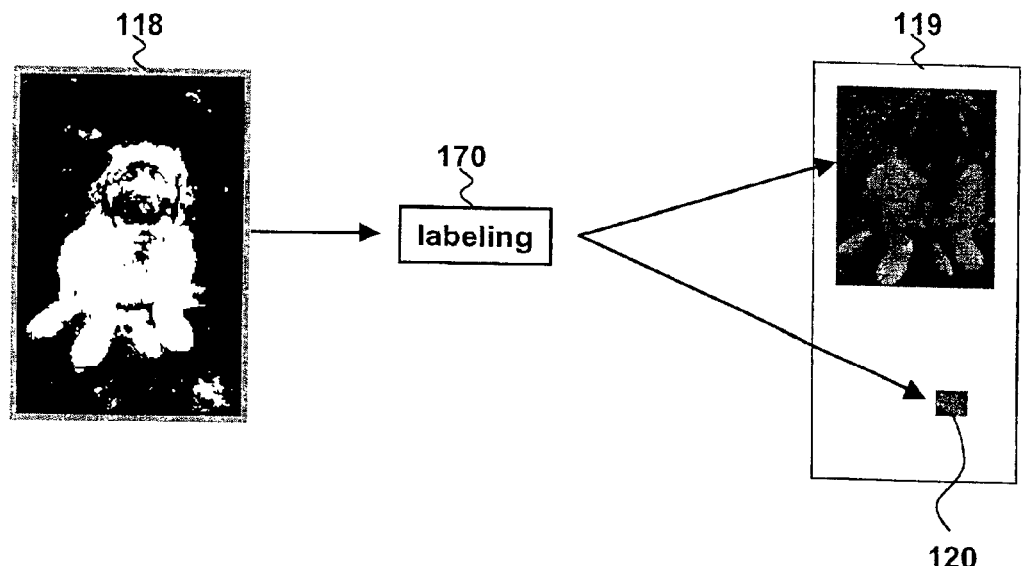
FIG. 14 is a diagrammatic view of a final step of labeling.

FIG. 9 shows the similar charting process performed on each of the subdivisions or binary mask images that result from different segmentation operations performed on the correlated single-plane intermediate images 11 to 13.

In this way, the binary mask images 21, 51, 31, 61 from the subdivision steps 120, 120', 130, 130' lead via charting step 150 to a result image 111 using a process analogous to that described for obtaining the result image 114 of FIG. 8.

Similarly, the binary mask images 22, 52; 32, 62 from the subdivision steps 120, 120', 130, 130' lead via the charting step 150 to a result image 112, and the binary mask images 23, 53, 33, 63 from the subdivision steps 120, 120', 130, 130' lead via the charting step 150 to a result image 113.

The four result images 111 to 114 are then binarized in order to validate overlap between redundant regions constituting the cores.

More particularly, the charting process illustrated in FIGS. 7 to 9 and corresponding to the step of arbitrating between differing results comprises the following steps, based on all the binary masks coming from the subdivision procedures performed on an image to be processed, and corresponding to each of the intermediate images 11 to 14:

allocating binary mask planes as a function of associated success rates;

building up cores (high-certainty areas) by summing;

creating cores by thresholding;

labeling;

writing out a text file containing the Cartesian coordinates of the covering boxes for the objects located in the image; and saving the resulting binary mask image.

The result images 111 to 114 from arbitration step 150 constitute an abstract representation of object cores. There follows a description with reference to FIGS. 10 to 14 of the reconstruction step which essentially consists in using the abstract primary knowledge concerning the various identified cores and the initial color image to reconstruct the object(s) contained in the image. This achieves final localization of objects by propagating minimum information of high certainty (cores) to the initial image. After this step, the objects are reconstituted in color and in their original positions while nevertheless being isolated, and reconstruction terminates.

Reconstruction step 160 itself comprises two stages 161 and 162. A first stage 161 processes the correlated images 111 to 113 and then the second stage 162 performs reconstruction both on the basis of the results of the first stage and as a function of the decorrelated image 114. An example showing this reconstruction is illustrated in FIGS. 10 to 13.

The result images 111 to 113 of the chartings in correlated planes are subjected within the first processing stage 161 to a weighted summing operation 163 to provide a result image 115 which is colored in a step 164 to provide an image 116 (FIG. 1) itself subjected to a binarization operation 165 to supply a reconstructed RGB image 117 which constitutes a binary image.

The coloring operation consists in filling in a surface with its intrinsic color, which is a single color representing the mean color, for example. Starting from an initial pixel together with each of its nearest neighbors, the neighbors are colored if they are distant from the initial pixel by less than a given metric (e.g. Euclidean). The operation is recursive, and in turn each of the previous nearest neighbors subsequently becomes an initial pixel.

It should be observed that step 164 includes determining cores (high certainty areas) by thresholding and coloring using the threshold distance starting from the cores. If during a labeling operation the resulting image is considered as being not valid, then step 164 can be reiterated with a smaller threshold distance.

Prior to the second stage 162 of the reconstruction step 160, a reconstructed RGB image 117 is obtained together with an image 114 of the charting of the decorrelated image 14.

In the second stage 162, reconstruction processing is performed in the same manner as that described above with reference to the images 111 to 113. Thus, in the second stage 162, the images 117 and 114 are summed, and then colors are propagated as indicated in step 164 of FIG. 11. The resulting image is binarized as shown in step 165 of FIG. 12, so as to form a binarized reconstructed image 118 which is then subjected to a final labeling process 170 to provide a binary mask of the identified objects together with their Cartesian coordinates.

Figure 15:
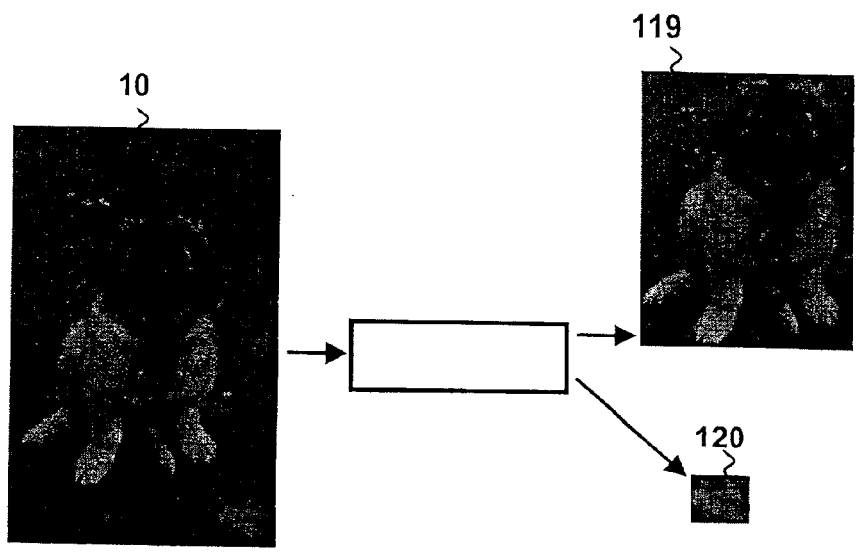
FIG. 15 shows an example of an initial image being transformed into final images in accordance with the invention.

FIG. 15 shows an example of an initial image 10 comprising two meaningful main objects, namely a dog and a leaf. It also shows the final images of individualized objects that have been identified automatically by the method of the invention, i.e. the image 119 of a dog and the image 120 of a leaf.

Figure 16:
FIG. 16 is an example of a final image obtained manually.
Figure 17:
FIG. 17 is an example of a final image obtained automatically in accordance with the invention.

FIG. 16 shows an example 16 of a manual process of subdividing the initial image 10 into objects, while FIG. 17 shows the binary image that results automatically from the method of the invention starting from the same initial image 10.

Figure 18:
FIG. 18 is an example of an image that results from a conventional segmentation method.

FIG. 18 shows an example of an image 18 that has been segmented in conventional manner into regions starting from the initial image 10, but that is not capable of enabling each object in the image to be identified autonomously.

What is claimed is:

1. A method of processing images for automatically partitioning an image, or a plurality of elements, or of objects of shape that is meaningful solely on the basis of the data constituting the image to be analyzed, the method being characterized in that it comprises the following steps:
a) producing, from the image to be analyzed, first, second, and third correlated achromatic single-plane images containing all of the information in the image to be analyzed but presenting different color characteristics;
b) subjecting the first, second, and third images to a plurality of segmentation operations to find uniform components based on differing criteria;
c) for each of the first to third processed images, analyzing the results of the various segmentation operations in order to generate "cores" that are constituted by zones presenting high certainty of the existence of objects in association with each of the first to third processed images;
d) for each of the first to third processed images, comparing the cores that result from the various segmentation operations and conserving as indicative of the presence of an object those zones which correspond to more than a determined threshold of different cores in quantity;
e) performing weighted summing of the first to third images as processed in order to obtain a first result image containing the cores of the uniform components;
f) coloring and then binarizing the first result image in order to obtain a second result image containing the uniform components; and
g) extracting the individualized objects from the image.

2. A method according to claim 1, characterized in that it includes an additional step h) of producing a de-correlated fourth image using the HSV model starting from the image to be analyzed, in that steps b), c), and d) are also applied to the fourth image, and in that after step f), a step i) is performed of reconstructing an image identifying individualized objects by combining the second result image with the previously-processed fourth image so as to obtain a third result image, and in proceeding again with coloring the third result image, prior to extracting the individualized objects of the reconstructed image.

3. A method according to claim 1, characterized in that the correlated achromatic single-plane first, second, and third images are produced by splitting the image to be analyzed into three frequency bands in the RGB color space.

4. A method according to claim 1, characterized in that during step b) of segmenting into uniform components by using a plurality of different criteria, the following steps are performed:
   i) detecting outlines; and
   ii) detecting texture characteristics via filtering that is equivalent to a bank of highpass and lowpass filters.

5. A method according to claim 4, characterized in that during step b) of segmenting into uniform components using a plurality of different criteria, the following step is also performed:
   iii) chromatic and achromatic detection.

6. A method according to claim 1, characterized in that coloring step f) consists in starting from an initial pixel and in coloring each of its nearest neighbors with a similar color value if the value of a nearest neighbor is distant by less than a given metric from the initial pixel, and in reiterating the process recursively, each of the nearest neighbor pixels becoming in turn an initial pixel.

7. A method according to claim 1, characterized in that steps b) and c) are performed at least twice, on each occasion performing the segmentation operations by using sets of input control parameters that are nominally defined with different values.

8. A method according to claim 1, characterized in that within each segmentation operation, the input control parameters are modified automatically at the end of a segmentation process if the results obtained are not meaningful, in which case the segmentation process is reiterated automatically by looping back through the process using modified new values for the input control parameters.

9. A method according to claim 4, characterized in that an operation of segmenting into uniform components by detecting outlines with an optimum filter comprises the following steps:
   converting the initial RGB space to be processed into a single luminance plane;
   averaging in order to eliminate noise associated with acquisition;
   calculating horizontal and vertical gradients;
   summing the two gradient images in order to obtain a single image;
   seeking the minimum and the maximum in the resulting image in order to determine high and low thresholding values;
   thresholding by hysteresis relative to the previously-determined high and low thresholding values;
   eliminating edges;
   binarizing;
   morphological opening followed by multiple morphological closing in turn followed by multiple morphological opening; and
   filling in the holes in order to convert the resulting outlines into a result that is available in the form of regions.

10. A method according to claim 4, characterized in that an operation of segmenting into uniform components by detecting texture characteristics using filtering equivalent to a bank of highpass and lowpass filters comprises a wavelet transformation process which is performed firstly on the rows and secondly on the columns of the image, each time using a lowpass filter, characterized by the formula:

$$y(i)=0.5*x(i)+0.5y(i-1)$$

and a highpass filter, characterized by the formula:

$$y(i)=0.5*x(i)-0.5y(i-1)$$

each element (i,j) of the 3D attribute matrix that results from the splitting being a vector characterizing the distribution of pixel values in the vicinity of the point (i,j).

11. A method according to claim 10, characterized in that after each operation of filtering by a highpass filter and a lowpass filter, the number of images obtained is divided by $2^n$ so as to reduce the number of images to be processed, the integer number n being greater for higher resolution and larger size of the image to be processed.

12. A method according to claim 10, characterized in that the wavelet transformation process is reiterated a plurality of times over n stages, and in that after a smoothing stage, the size of the resulting 3D attribute matrix is reduced in depth by retaining only the [2n+(n−1)] images that contain the most detail.

13. A method according to claim 10, characterized in that a process is performed of seeking the partitioning of the attribute matrix that is best in terms of maximizing energy.

14. A method according to claim 5, characterized in that an operation of segmenting into uniform components by performing chromatic and achromatic detection comprises a step of converting the image into the HSV model, a step of achromatic propagation in order to eliminate the background, an opening step performed during a first iteration to eliminate noise and in order to reconnect regions, and in the event of non-convergence at the end of this first iteration, a closing step performed during a second iteration.

* * * * *

UNITED STATES PATENT AND TRADEMARK OFFICE
CERTIFICATE OF CORRECTION

PATENT NO. : 6,937,761 B2 Page 1 of 1
APPLICATION NO. : 10/164285
DATED : August 30, 2005
INVENTOR(S) : Corinne Thomas et al.

It is certified that error appears in the above-identified patent and that said Letters Patent is hereby corrected as shown below:

Column 6, line 39, "calorimetric" should read --colorimetric--.

Signed and Sealed this

Ninth Day of January, 2007

JON W. DUDAS
*Director of the United States Patent and Trademark Office*